April 3, 1924.

I. K. TRAU

Re. 15,815

CAP

Original Filed Jan. 18. 1922

Inventor

Isidor K. Trau,

By J. Harkson

Attorney

Reissued Apr. 8, 1924. Re. 15,815

UNITED STATES PATENT OFFICE.

ISIDOR K. TRAU, OF LOUISVILLE, KENTUCKY.

CAP.

Original No. 1,414,797, dated May 2, 1922, Serial No. 530,121, filed January 18, 1922. Application for reissue filed April 16, 1923. Serial No. 632,553.

*To all whom it may concern:*

Be it known that ISIDOR K. TRAU, a citizen of the United States, residing at Louisville, in the county of Jefferson and State of Kentucky, has invented certain new and useful Improvements in Caps, of which the following is a specification.

This invention relates to garments and has special reference to a cap.

More particularly the invention relates to a cap having means for adjusting the same to heads of various sizes.

The principal and most important object of this invention is to provide an improved construction of adjustable cap wherein means will be used such that the cap may be adjusted without being placed on the head of the wearer, to fit the size of the wearer's head, the adjusting means being provided with size indicia associated therewith to enable this adjustment to be effected.

A second important object of this invention is to improve the general construction of adjustable caps.

A third important object of this invention is to provide an improved construction of adjustable cap wherein the adjusting means will be of such character that it is simple of construction and may be made of ordinary stock parts.

A fourth important object of this invention is to provide an improved form of cap of the class described wherein the adjusting means will not produce, when the size of the cap is reduced, unsightly or uncomfortable folds or bulges in the cap material.

With the above and other objects in view, the invention consists in general of certain novel details of construction and combinations of parts hereinafter fully described, illustrated in the accompanying drawings, and specifically claimed.

In the accompanying drawings, like characters of reference indicate like parts in the several views, and:—

Figure 1:
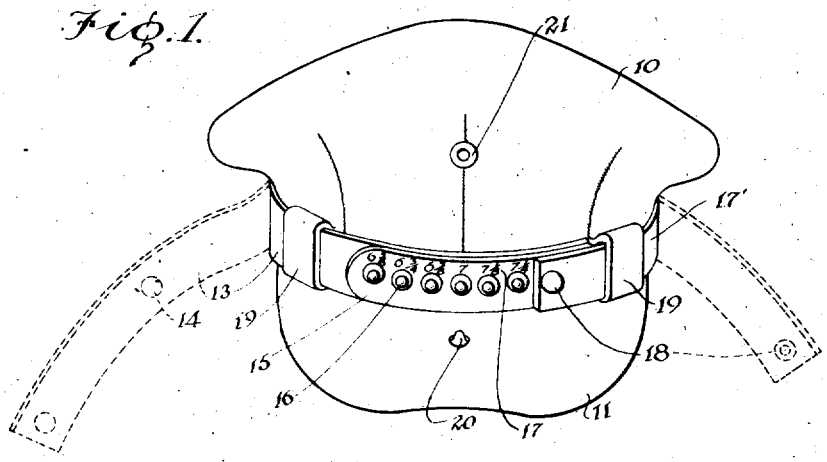
Figure 1 is a front view of a cap constructed in accordance with this invention, the adjusting means being shown in full lines in one position and in dotted lines in a second position.

In the construction of a cap in accordance with the present invention there is employed the usual body 10 and vizor 11. At each side the body is slit from the bottom edge upwards as shown at 12, the slits extending upward for about one inch so as to terminate above the upper edge of the band portion of the cap.

Sewed to one side of the cap just back of the slit 12 is one end of a flexible band 13 whereon is secured, as by fasteners 14, a metallic strip or band 15 provided with a series of spaced snap buttons 16. Above these buttons 16 are suitable indicia to show which button is to be used to adjust the cap to a given size.

Sewed to the other side of the cap just behind the slit 12 on that side is the rear end of a flexible band 17 which is provided, adjacent its free end, with a snap eye 18 of the proper size to fit the buttons 16. This band 17, as well as the band 13 are led through keeper straps 19 sewed to the front of the cap.

It will be noted that while I have here described the size adjusting elements as snap buttons, it is obvious that other means may be employed of many different characters which, for the purpose, are the full equivalent of snap buttons, it being merely necessary and essential that the proper size indicia should always be associated with such other means.

Figure 2:
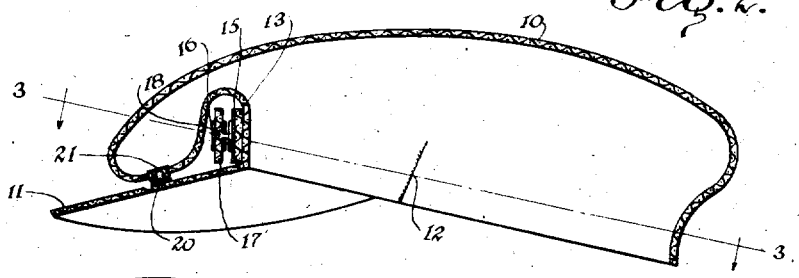
Figure 2 is a vertical longitudinal section on the median plane of the cap.
Figure 3:
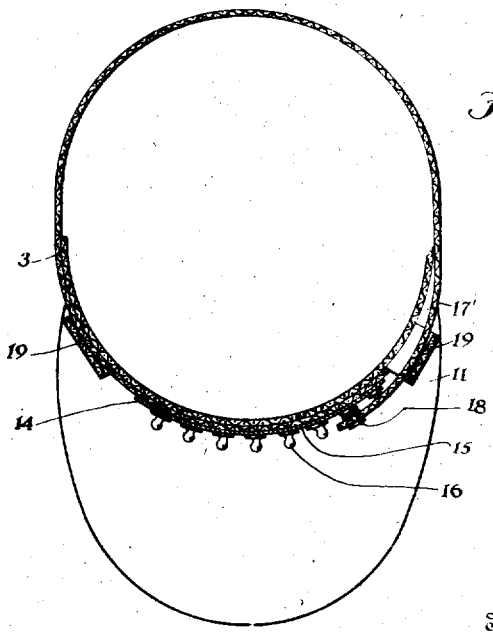
Figure 3 is a section on the line 3—3 of Figure 1.
Figure 4:
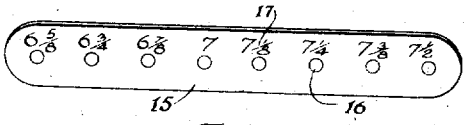
Figure 4 is a face view of the sizing strip forming part of the adjusting means for the cap.

The cap is also provided with a snap button 20 on the vizor 11 and a snap eye 21 on the front of the cap so that the front may be buttoned down as shown in Figure 2, and thus conceal the adjusting means.

The adjustment of this cap from one size to another is readily effected by lifting the front of the cap and then shifting the snap eye from one to another of the buttons 16 after which the cap front is again snapped down. Moreover this adjustment is effected with out producing bulges or folds which are either unsightly or uncomfortable since the slits 12 permit a certain amount of overlapping of the front and back parts of the cap at the band portion.

There has thus been provided a simple and efficient device of the kind described and for the purposes specified.

Having thus described the invention, what is claimed as new, is:—

1. A cap of the character described, having a body provided with slits extending upward from its bottom edge, straps extending from the rear edges of the slits and overlapping in front of the body, a strip secured to the face of one of the straps and provided with spaced snap button members mounted thereon at predetermined size intervals, said strip having size indicia impressed on the strip adjacent the respective snap button members and a cooperating snap button member on the other strap.

2. A cap of the character described, having a body provided with slits extending upward from its bottom edge, straps extending from the rear edges of the slits and overlapping in front of the body, a rigid strip secured to the face of one of the straps and provided with spaced snap button members mounted thereon at predetermined size intervals, said strip having size indicia impressed on the strip adjacent the respective snap button members and a cooperating snap button member on the other strap.

3. An adjustable cap including a body having straps secured at its sides and projecting forwardly to overlap on the front of the cap, a plate fixed to one of the straps and provided with a plurality of adjusting means each having a corresponding size index associated therewith, and a cooperating element carried by the remaining strap for selective engagement with said adjusting means.

In testimony whereof, I affix my signature.

ISIDOR K. TRAU.